Sept. 12, 1933.  O. U. ZERK  1,926,418
LUBRICATING SYSTEM AND METHOD
Filed Aug. 12, 1929  3 Sheets-Sheet 1
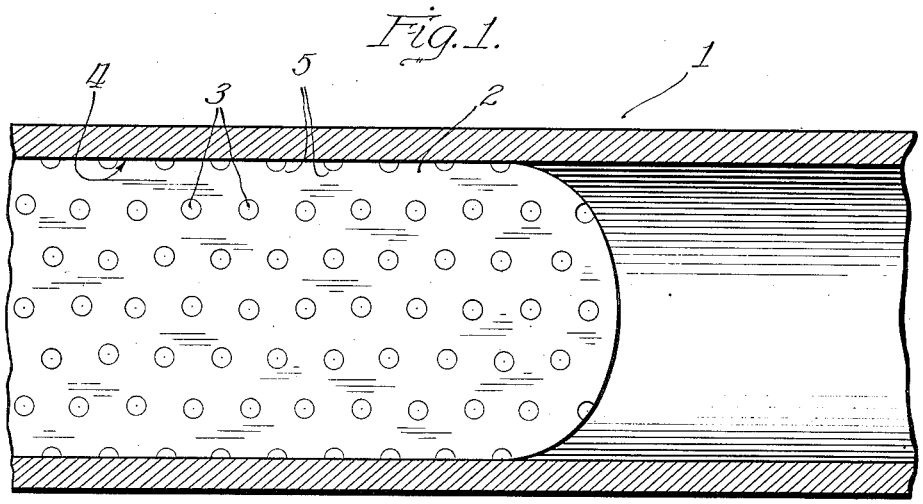
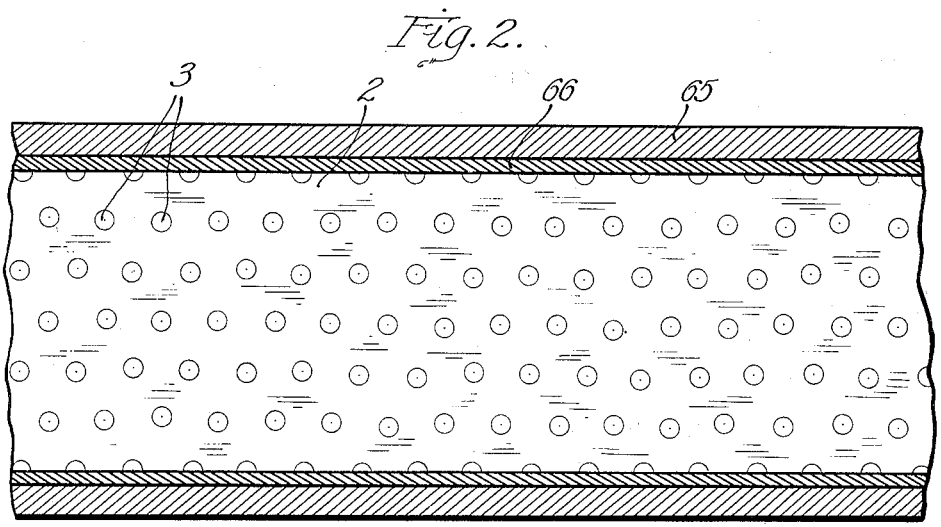
Inventor
Oscar U. Zerk
By Braun Jackson Boettcher Brenner
Attys.

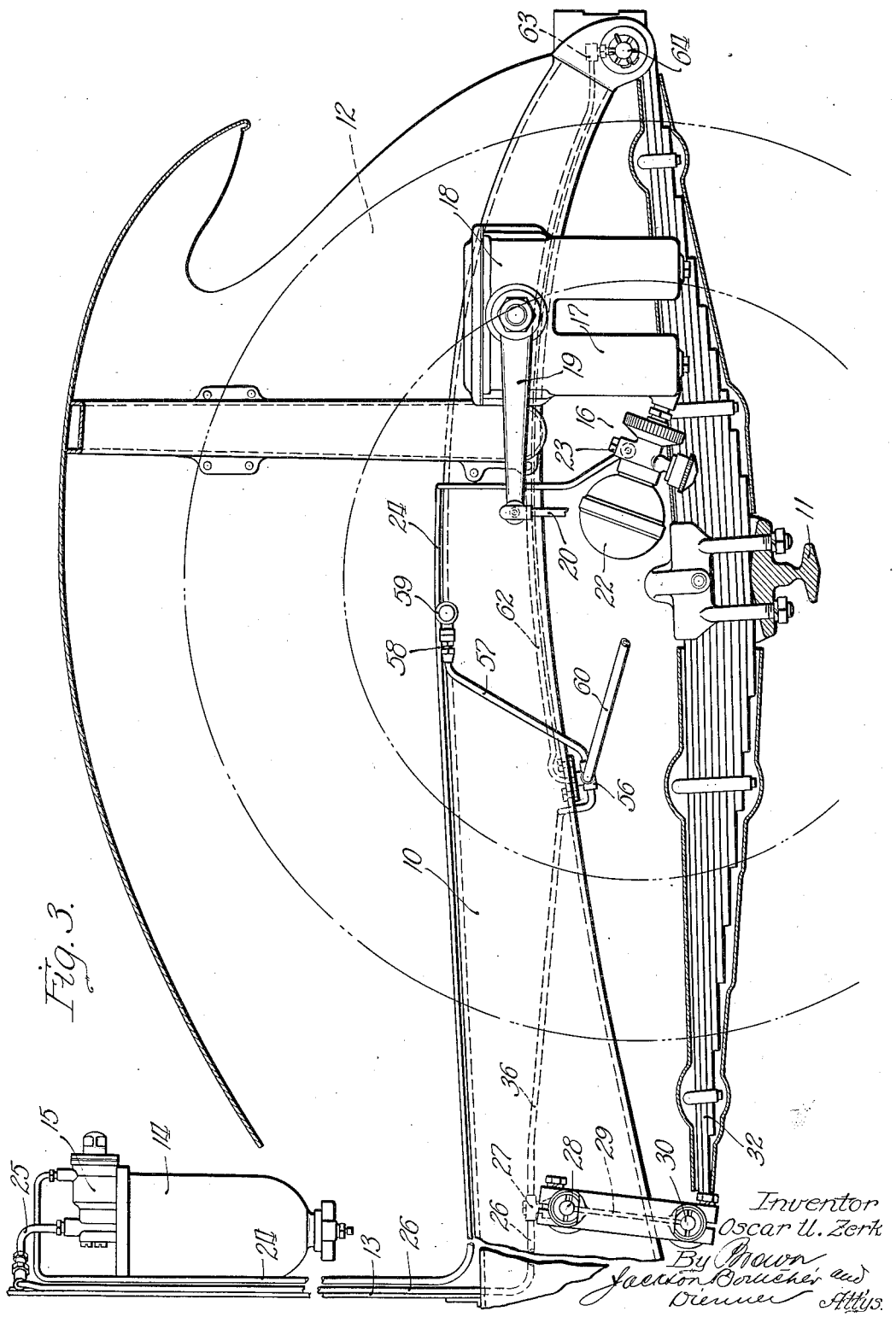

Sept. 12, 1933.　　　　O. U. ZERK　　　　1,926,418
LUBRICATING SYSTEM AND METHOD
Filed Aug. 12, 1929　　　3 Sheets-Sheet 3

Inventor
Oscar U. Zerk
By Brown Jackson Boettcher & Dienner
Attys

Patented Sept. 12, 1933

1,926,418

UNITED STATES PATENT OFFICE 1,926,418

LUBRICATING SYSTEM AND METHOD

Oscar U. Zerk, Chicago, Ill., assignor to Alemite Corporation, Chicago, Ill., a corporation of Delaware Application August 12, 1929. Serial No. 385,295

21 Claims. (Cl. 184—7)

My invention relates to centralized lubrication and is adaptable equally well to automotive work, more particularly to the lubrication of the chassis of vehicles such as automobiles, tractors, gun carriages, war tanks, locomotives, airplanes, and the like, or to industrial lubrication, that is, the lubrication of stationary machines such as stamping presses, printing presses, textile machinery, shafting, and all the numerous types of machinery and machine tools of modern industry.

Heretofore oil has been used for centralized lubrication, especially for centralized chassis lubrication. While oil is a good lubricant it cannot be successfully employed for certain bearings of an automobile, such as wheel hubs and such other places where cavities adjacent the bearings are to be filled with lubricant and from which cavities the bearings derive their supply of lubricant.

The difficulty is further increased in such cavities as are covered only by leather coverings or like shields which cannot be made tight or leak-proof. Other such places on a chassis are the king bolt bearings, especially where ball or roller bearings are used, tie rod bearings, steering knuckle bearings, front wheel brake bearings, steering gear housing bearings, and the like. Due to the fact that grease is the best lubricant for these cavity surrounded bearings, they have been designed for grease lubrication, and a separate hand operated grease gun lubricating system is used on automobiles which are provided with a centralized system of chassis lubrication using a thin grade of oil for the remainder of the bearings.

Since the number of bearings which are required to be lubricated by hand with grease amounts to about ten to fifteen on each chassis, depending upon whether a hydraulic or mechanical four wheel brake system is employed, it can readily be understood that the lubrication of such a large number of bearings by hand detracts greatly from the advantages of using a centralized lubricating system. Automobile drivers having cars equipped with a manual or automatic system of centralized chassis lubrication gain the false impression that the centralized chassis lubricating system takes care of all of the bearings of the car. This, of course, is not the case. Such false impression causes them to overlook the lubrication of from ten to fifteen bearings which need grease lubrication by hand with the result that these grease lubricated bearings often receive no lubrication at all.

The greatest advantage in using grease instead of oil in centralized chassis lubrication is that grease stays in place while oil flows. Grease does not drip from the bearings nor from the pipeline system and will, therefore, not form pools of oil below the car which is one of the chief drawbacks of the older systems employing oil for centralized lubricating purposes. Where grease is used in a centralized lubricating system check valves in the metering units, particularly in resistance units, may be dispensed with.

Despite the great advantage which grease has as a lubricant, grease has not been successfully used for centralized chassis lubrication due to the large friction of flow of the grease in a relatively small diameter pipeline. There is such a great variation in the resistance between the longer and a shorter pipeline that most, if not all, of the grease would escape through a bearing nearest the grease pump and very little grease, or none at all, would enter a bearing furthest away from the grease pump.

The main object of my present invention is to provide a novel means and method for the employment of grease or very high viscosity oils for lubricating an automobile chassis or any other machine or machine tool. Specifically the system of the present invention is designed for the use of grease.

Where grease is used as a lubricant in a centralized lubricating system the friction of flow against the containing walls is relatively great. Likewise, its internal friction is relatively great. Where pipelines of relatively small diameter are employed the friction against the side walls is an important factor. The total friction to the flow of the grease in the pipeline system increases with the length of the pipeline, necessitating the use of very high pressures for delivering the grease at the end of a relatively long pipeline. The resistance to flow in the pipelines may, as the tube is increased in length, bcome so great that it is impossible to force grease through the pipeline under any conditions. In the lubricating system of my invention I intend to use normal pressures and fairly small diameter pipelines for a centralized lubricating system using grease and aim to get substantially even distribution of grease at all of the bearings where such equal distribution is desired irrespective of the distances of the bearings to the grease pumps within limits. It is far more difficult to provide a grease which will move in the pipeline system substantially with the same resistance in summer as in winter than it is in the case of oil. Where oil is used, any contained particles of water will ultimately settle to the bottom of the container and will separate from the oil, but in grease such particles of water will remain embedded.

Grease containing small particles of water will become considerably stiffer in winter than in summer due to the many embedded frozen water particles which are solid. While a frozen water particle will help to reduce the friction between the grease and the inner surface of the containing pipeline in wintertime, this advantage is offset by the stiffer grease caused by the contained solid particles. The oil used in the manufacture of grease has a great influence upon the stiffening of the grease in cold weather. A grease made of low cold test asphaltum base zero oil will change its stiffness in wintertime much less than a grease made of paraffin base oil, which is not a zero oil. The fundamental rule in manufacturing grease to be used in centralized chassis lubricating systems was, therefore, complete absence of water from the grease and the use of a low cold test zero oil.

However, grease made under the above conditions will still be unsuitable in pipeline systems with pipes of relatively small inside diameter. For this reason I supply means to reduce the surface tension between the grease and the inside walls of the pipeline system to a minimum in order to secure substantially the same delivery capacity at the end of a long pipeline system as at the end of a short pipeline system.

I achieve this reduction of friction to flow of grease in the pipeline system in several ways. The first is to employ a special grease, particularly such a one as is disclosed and claimed in my copending application, filed August 7, 1929, and bearing Serial No. 384,120.

Another general way is to employ a special preparation of the inside of the pipeline system to reduce the friction of flow between the side walls of the containing pipeline and the grease. Preferably both features are employed in combination and, preferably, a third feature is embodied and that is the employment of such an admixed material in the grease as will assist in maintaining the adhesion reducing qualities of the specially prepared surface on the inside walls of the pipeline system.

In one example of my invention, I coat the inside surface of the pipeline with gelatin, or the like, care being taken to preserve the gelatin from deterioration or injury. Benzoate of soda or other preservatives or germicides may be employed in the grease in order to prevent bacterial action upon the gelatin.

It is advantageous to keep the gelatin in damp or wet condition so that the water in the gelatin will provide a smooth or slippery surface whether in the form of liquid or whether the same should be frozen. It is a well known fact that greases or oils and water are repellent to each other and that, therefore, grease or oil slide along a wet surface with a much lower degree of friction or adhesion than would be the case if the grease were flowing on a dry surface.

The inside surface of the pipeline may be prepared by applying a coating thereto either by dipping the pipeline in a gelatin solution or forcing a heated gelatin solution through the heated pipeline by mechanical or hydraulic pressure means. After the gelatin has been forced through the pipeline, it should not be permitted to become dried out as a certain moisture content is desirable when the same is to be used. The drying process may be performed by blowing warm air through the pipeline or by heating the pipeline from the outside or sucking air through the pipeline, either hot or cold. While a perfectly dry gelatin has a somewhat greater surface adhesion to grease than the wet gelatin it has less adhesion with respect to the grease than has the metal tubing. The covering of the inside surface of the pipeline with a gelatin maintained in a moist condition is only one of numerous methods which I can employ under the present invention to reduce the surface tension between the grease and the metal. It is highly desirable that the coating or film which is to be maintained in the pipeline shall be as flexible as the pipeline system and shall not form chips, scales or other obstructions nor separate from the surface of the pipeline.

Another example of preparation of the pipeline system which has the advantage of materially reducing the surface friction between the grease and the walls of the pipeline, but which has the additional advantage that by using a special grease any part of the coating applied to the walls of the pipeline system that is carried away by the moving grease will be restored by means contained within the grease.

Another example is to cover the inside surface of the pipeline system with mercury or mercury amalgam. An amalgamated surface has much less friction to the flow of grease than the inside metal surface of a drawn tube. The inside surface of a drawn metal tube of a small inside diameter of about ⅛ to ¼ inch inside diameter is in reality very rough because below ½ inch inside diameter tubes are drawn without a mandrel. Such a surface under the microscope looks like a file. When the inside surface of such a metal tube is amalgamated or coated with mercury or mercury amalgam this dissolves the high spots or projections and flows into the depressions of the surface, rendering the surface far more smooth. In addition the mercury has a great affinity for the metal and its adhesion to the metal is far greater than the adhesion between mercury and grease. Thus in addition to smoothing the inside surface of the pipeline system a thin film of mercury or mercury amalgam tends to maintain itself upon the inside walls of the pipeline system. Copper tubing is generally employed for this purpose but, as I shall point out later, iron or steel tubing or tubing of other materials may be employed instead. To prepare the inside surface of the tube for amalgamation it may be cleaned as by a cyanid solution, air acid solution, ether or other suitable compound, after which metallic mercury is forced by pressure or run by gravity into the tube and will thereupon form the coating desired.

In place of metallic mercury salts of mercury may be employed to deposit metallic mercury upon the inside walls of the pipeline. I prefer bichloride of mercury or nitrate of mercury for this purpose. Other suitable salts of mercury may be employed.

If a copper or brass tube is employed the process of amalgamation is simple, since the copper or brass has an affinity for mercury. In the case of tubing of a metal which does not normally amalgamate with mercury, such as steel tubing, an amalgam may be forced into the pipeline, for example, an amalgam of copper and mercury or sodium and mercury, or the inside surface of the steel tube may be coated by mechanical or electrical means with a metal which has an affinity for mercury, as, for example, copper. If desired, the inside surface of the steel or iron tube may be first covered with a thin coating or sleeve of copper, or other material having an affinity for mercury or mercury amalgam.

Another method of rendering the inside surface of the tube, whether it is of steel or copper, suitable for amalgamation is by tinning the same. The tinning process may consist of dipping the tube in suitable acid, such as hydrochloric acid or sulphuric acid or by forcing a stream of acid solution through the tube and then dipping the tube in molten tin. If it is desired to save the cost of tinning the outer surface, the tin may be forced through the heated pipe in molten condition.

Mercury may also be deposited by electrolytic deposition upon the inside walls, if desired.

Since it is possible that in quantity production the amalgamation of the inside surface of the small metal tubing may not be uniform and since, also, it is possible that some of the amalgam may be abraded from the inside surface of the metal tubing by the action of the moving grease, or other action, or by the soaking of the mercury into the body of the tubing, it is highly advantageous to employ automatic means to maintain the mercury or mercury amalgam at the inside surface of the metal tubing by depositing a fresh supply of mercury or mercury amalgam thereupon.

For this purpose I mix with the grease which is used in combination with the aforesaid pipeline system finely divided mercury or mercury amalgam. The amount of mercury or mercury amalgam used in the grease may be comparatively small because the greater part of its content will be deposited on the inside surface of the pipeline and will adhere to or combine with the original coat of mercury or mercury amalgam.

No matter if mercury or mercury amalgam is mixed with grease in connection with previously amalgamated inside surfaces of the metal tubing, or if the metal tubing is amalgamated at its inside surface and used in connection with grease having no mercury amalgam, or if the grease containing mercury or mercury amalgam is used with a non-amalgamated metal tubing some of the mercury, or mercury amalgam, will ultimately reach the bearings and will tend to amalgamate the surfaces of the bearings particularly where these surfaces are properly treated in such a manner that they are amalgamable.

It can be seen, therefore, that the use of an amalgamated metal tubing or the use of the grease containing mercury or mercury amalgam will act as an excellent addition to the lubricating qualities of the grease, particularly on bearings in which the rate of motion of the bearing surfaces is relatively low. Due to this highly increased lubricating quality of the grease either by mixing it with mercury or mercury amalgam before it is forced into the pipeline system, or by forcing grease with or without additional content of mercury or amalgam through the tubing, or by using a previously amalgamated inside surface of the metal tubing whereby the bearing is continuously supplied with mercury or amalgam, the amount of grease used in a system of this kind may be relatively small. This permits of a saving of grease and has the additional advantage that the reservoir containing the grease may be smaller or may be filled at less frequent intervals.

It is a known fact that bearings, particularly those which do not have a rapid rate of motion, which are provided with amalgamated surfaces may operate satisfactorily without additional lubrication providing always that the film of mercury or amalgam is maintained.

The mercury or amalgam need not be mixed with the grease before it is introduced into the pipeline system or into the grease pump. A separate compartment may be provided for the mercury or amalgam from whence either at intervals or continuously small amounts of mercury or mercury amalgam may be introduced into the pipeline system and mixed with the grease in the pipeline system or in the grease reservoir.

Another method of reducing friction in the pipeline system is to mix air with the grease, the air being in finely subdivided form. The resultant mixture of air and grease forms a foamlike body in which the air bubbles will tend to stay continuously embedded in the grease. When such air containing grease is forced into the pipeline system the actual contacting surface between grease and the walls of the pipeline during movement of the grease is considerably reduced, depending naturally upon the amount of air mixed with the grease. Since air has no appreciable surface tension or adhesion to the inside surface of the pipeline and has no cohesion the friction to flow is materially reduced.

Due to the fact that both mercury or amalgam and air mixed in finely divided form with grease individually reduces the friction between the grease and the inside surface of the pipeline, I may mix both mercury or amalgam and air with the grease.

An object of my invention is to reduce the friction and surface adhesion between the grease and the inside walls of the pipeline system to a minimum thereby tending to equalize the resistance of long and short pipelines to a sufficient degree to permit a substantially equal amount of grease to be emitted at bearings at different distances from the grease pump where equal emission is desired.

Another object of my invention is to prepare the inside wall of the pipeline system for centralized grease lubricating system before lubricant is forced into the pipeline system in order to reduce materially the friction between the grease and the pipeline.

Another object of my invention is to use a special grease in a pipeline system employed for centralized lubricating systems which pipeline may not be prepared beforehand and wherein the additions to the grease will minimize the friction between the grease and the pipeline system.

Another object of my invention is to use a special grease in a pipeline in connection with centralized lubricating systems where the contents of the grease will chemically or mechanically affect the inside surface of the pipelines in such a manner as to decrease substantially permanently the friction and surface tension between the grease and the inside diameter of the pipelines and all other parts and conduits wherein the grease moves.

Another object of my invention is to use a pipeline system in connection with centralized lubricating systems wherein the inside walls are covered with mercury or mercury amalgam and a grease containing mercury or mercury amalgam is employed therein whereby the content of mercury or mercury amalgam in the grease will supplement the mercury or amalgam on the inside walls of the pipeline system.

Another object of my invention is to transfer the mercury or amalgam from the grease or from the inside walls of the pipeline to the bearings, minimizing the friction at the bearings.

Another object of my invention is to provide means whereby the friction between the grease and the inside surface of the pipeline used for centralized lubrication is materially reduced.

Another object of my invention is to use tubing with a specially prepared smooth inside surface.

Another object of my invention is to use tinned steel or copper tubing for centralized lubrication.

Another object of my invention is to use grease containing air in finely divided form in connection with centralized lubricating systems for reducing the surface friction between the grease and the inside surface of the pipeline.

Another object of my invention is to use grease containing air in finely divided form in connection with pipelines tinned or otherwise specially prepared on the inside in order to reduce the surface friction between the grease and the inside of the pipeline.

Another object of my invention is to obtain more nearly equalized distribution of grease at the various bearings by using pipelines with an inside diameter which is larger than five thirty-seconds of an inch.

Another object of my invention is to provide a method of mixing finely divided air particles with grease in a centralized system of lubrication.

Another object of my invention is to use grease containing either air in finely divided form or glycerin in finely divided form or other liquids or a combination of one or more of such fluids in connection with a centralized lubricating system for reducing the friction between the grease and the inside surface of the pipeline and for reducing the cohesion in the grease to enable the grease to move more freely in the pipeline system.

Another object of the invention is to provide in a centralized lubricating system a pipeline with a coating for the inside walls the surface of which coating has low frictional resistance with respect to the flow of grease (such as moist gelatin) and to maintain such surface in suitable condition by an ingredient embodied in the grease (such as water or an aqueous solution).

Another object is to employ for the walls of the pipeline system a material metal or alloy having a low frictional resistance to the flow of a heavy lubricant.

Another object of the invention is to use aluminum tubing for the pipeline system of a centralized lubricating system.

Numerous other objects will be apparent from the following specification and claims.

Now in order to acquaint those skilled in the art with the manner of practicing my invention, I shall describe in connection with the accompanying drawings a specific embodiment of the same.

In the drawings:

Figure 1 is a longitudinal section through a pipe in which a body of grease of my invention is being forced from the left to the right;

Figure 2 is a similar view of a pipeline containing grease in which the interior surface of the pipeline has been specially prepared to reduce the friction between the grease and the containing walls of the pipeline;

Figure 4:
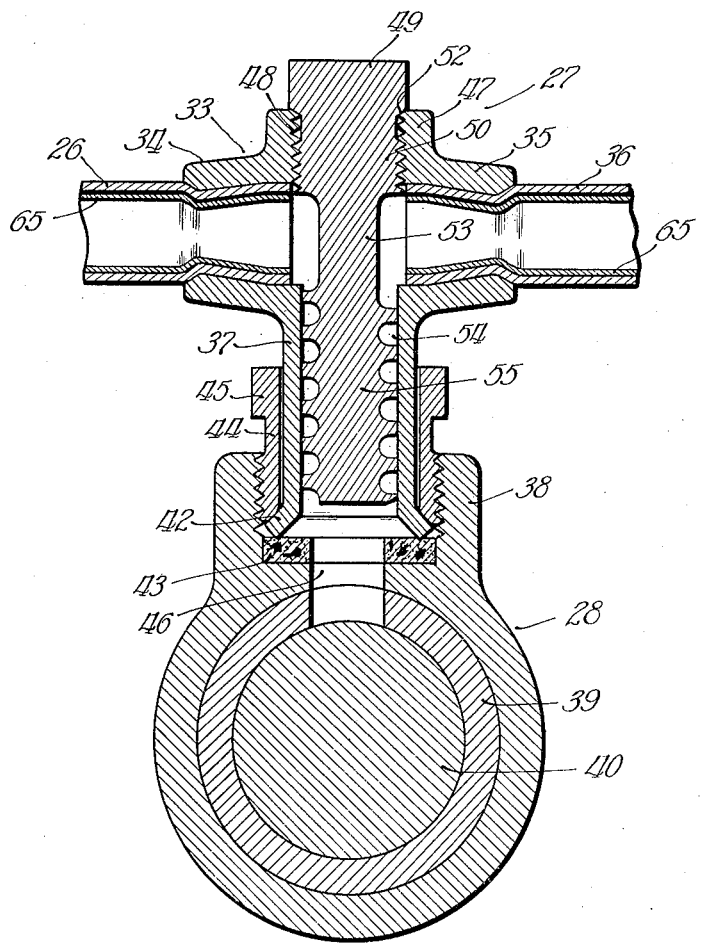

Figure 3 is a side elevational view, partly in section, of a lubricating system employing grease. The system illustrated in Figure 3 is an automatic centralized lubricating system employing the grease of my invention and the prepared pipeline system of my invention; and Figure 4 is a longitudinal section through a metering unit embodying a resistance element adapted for supplying grease to a bearing.

Referring, first, to Figure 1, I have shown a tube 1, which may form a part of the pipeline system of a centralized lubricating system in which a body of grease 2 is being driven by pressure from the left to the right.

The grease 2 is of a special composition, as disclosed in my copending application, Serial No. 384,120, filed August 7, 1929. This grease 2 contains admixed particles 3 of a fluid of less cohesion than the body of the grease. The particles 3 also have less adhesion with respect to the inside surface 4 of the pipe 1 for the dual purpose of decreasing the internal friction of flow of the grease 2 and also of decreasing its friction with respect to the surface 4 of the pipeline. As explained in my copending application, these particles 3 may be distilled water having a certain non-freezing ingredient added to them as, for example, glycerin, alcohol, calcium chloride, or the like. To whatever extent these particles of fluid engage the walls of the pipeline system, as indicated for example at 5, they reduce the adhesion of the mass to the inner wall 4.

Instead of water or an aqueous solution these particles may be mercury or other liquid which is repellent of grease. Likewise the particles 3 may be air bubbles or bubbles of gas which increase the fluidity of the mass of grease 2 and also decrease its adhesion to the inside surface 4.

By the above combination of a containing pipeline system and a body of grease the fluidity of which is increased and the adhesion of which to the walls of the pipeline system is decreased it is possible to distribute grease through a centralized lubricating system with much less inequality of delivery at the various points along the pipeline system and also with less force at the pump or other supply means for forcing the grease through the pipeline system and to the bearings.

If desired gas and liquid particles may be introduced into the grease for the same purpose, namely, to reduce the friction of flow and to equalize the distribution of grease throughout the pipeline system, since the delivery point, that is the metering units, leading to the various bearings are connected at different distances from the pump or other means which forces the grease through the pipeline system.

In Figure 3 I have shown a typical system of centralized lubrication of my invention in which the feature of reduced friction to flow and equalized distribution among the outlets of a pipeline system are employed. The front end of the frame 10 of an automobile chassis supported on the front axle 11 having front wheels indicated by the broken line 12 has a series of bearings which are to be lubricated by grease. Upon the bulk head or dashboard 13 I provide a reservoir 14 which is filled with the grease of my invention. This reservoir has a grease pump 15 which is driven by compressed air supplied by the automatic air pump 16 driven by variations in fluid pressure in the leg 17 of the hydraulic shock absorber 18. The shock absorber is of known construction and has its main body mounted upon the frame 10 with an operating arm 19 connected by a strut or connecting rod 20 to the axle 11.

Variations in pressure in the chamber 17 of the shock absorber 18 actuate the automatic air pump to charge the chamber 22 with compressed air. A differential pressure release valve 23 permits the compressed air in the chamber 22 to pass through the air pipe 24 to the motor cylinder of the grease pump 15 for drawing grease from the reservoir 14 and forcing the same out through the delivery pipe 25. From the delivery pipe 25 branch pipes run to each side of the chassis, the branch 26 being shown as leading to the right hand side shown in Figure 3. The delivery pipe and the branch pipe 26 and all connected grease pipes leading to the bearings are adapted to be used in connection with the novel grease of my invention disclosed in my aforesaid copending application. The branch pipe 26 leads to the metering unit 27 shown in dotted lines in Figure 3 for delivering grease to the shackle bearing 28. From the bearing 28 a duct 29 is provided for delivering grease to the lower shackle bearing 30 of the spring 32. In other words, grease which is distributed through the metering unit 27 passes to the bearing 28 through the bearing and through the duct 29 to the lower shackle bearing 30.

The form of metering unit indicated at 27 in Figure 3 is shown on an enlarged scale in section in Figure 4. It comprises in general a T-shaped body 33 having the lateral arms 34 and 35 into which are fitted adjacent ends of the tubes 26 and 36 which tubes are put into communication through said unit 27.

The shank 37 of the unit 27 is hollow and extends down into a socket formed in the boss 38 forming a part of the bearing 28. The bearing comprises an outer frame portion, a bushing 39 and the bolt or shaft member 40 which is adapted to rock or rotate with respect to said bushing 39. The lower end of the shank 37 is flared out as indicated at 42, and this flared end rests upon a gasket washer 43 which may be made of cork or other suitable gasket material. A threaded collar 44 is provided with a polygonal head 45 for threading into the socket formed in the boss 38. The lower end of said threaded collar 44 engages the flange 42 and serves to force the same down tightly into engagement with the gasket 43.

The hollow of the shank 37 communicates by way of a passageway 46 with the interior of the bearings. The bore of the shank 37 is continuous throughout the body, that is, in a vertical direction as shown in Figure 4, the upper end of the body having a boss 47 which is interiorly threaded as indicated at 48 and a pluglike member 49 having preferably a hexagonal or polygonal head for the engagement with a suitable wrench has a threaded cylindrical portion 50 threading into the bore in the boss 47. Below the head 49 there is formed a valvelike seat 52. This forms a fluid tight joint closing off the upper end of the bore. The head 49 has an integral shank 53 extending downwardly therefrom and lying within the bore, this shank having an enlarged lower end which is provided with a helical passageway 54.

The helical passageway 54 is defined in part by the whirls of the shank 37 and by the helical groove of generally semicircular or rounded cross-section formed on the surface of the body portion 55. The outer cylindrical surface of the body portion 55 fits relatively closely in the bore of the shank 37. The passageway 54 is of relatively large diameter so as to pass grease and the impurities which may be contained therein without causing obstruction.

From the arm 35 of the unit 27 the pipeline system continues as tube 36 to the four-way fitting 56. This four-way fitting 56 has a tubular pipe connection 57 leading up through a coupling 58 to the universal joint 59 of the stationary spindle of the mechanical four wheel brake mechanism.

As will be explained more in detail later, the four wheel brake mechanism contains a grease passageway leading to cavities for lubricating various parts of the four wheel brake mechanism and the coupling 58 does not contain a resistance unit. From the four-way connection 56 a flexible U-shaped tube 60 leads to the front axle king bolt, not shown, and the front wheel spindle bearing, also not shown, these parts having cavities which are adapted to be maintained full of grease.

The four-way connection 56 also has a connection with the tube 62. This tube 62 extends forwardly to a metering unit 63 which is of substantially the same construction shown in connection with Figure 4 except that one arm is closed off.

The metering unit 63 delivers grease to the bearing of the front spring bolt 64 for lubricating the same.

Where grease is delivered into the cavities such cavities have at their remote ends sufficiently tight outlets as to prevent the grease which is under relatively low pressure from being extruded therefrom so that grease is delivered not only into the cavities but also through the resistance units into the various bearings which it is desired to lubricate.

The lubricating system disclosed in Figure 3 is only a typical part of an entire centralized chassis lubricating system which illustrates sufficiently the character of the system in which my grease is adapted to be employed. The system as an operative system for pumping grease to the various bearings of the automobile chassis is fully disclosed and claimed in my copending application, Serial No. 394,363, filed September 21, 1929.

It will be observed at the four-way coupling 56 that grease is distributed to a number of bearings from a common central distributing point. The aim in each case is to make the distance between a bearing and the grease pump as nearly as possible of substantially the same length throughout so that an excessive pressure to deliver grease to each of the bearings is not required.

The delivery pipe 25 shown in Figure 3 is shown as coupled to the pipe 26 and there is a companion pipe for the opposite side of the vehicle frame also connected to the pipe 25.

The grease delivery pipeline system shown in Figure 3 may be specially prepared to decrease the resistance to flow of grease therethrough independently of the character of grease employed. However, a special grease is preferably employed in connection with such prepared pipeline system in order further to facilitate the delivery of grease through the pipes. The pipes are preferably made larger than five thirty-seconds of an inch in inside diameter.

In Figure 2 I have shown the inside of the pipe 65 as coated with a thin coating of gelatin indicated at 66. This gelatin is caused to adhere to the inner walls of the pipe 65 in a thin layer and it is adapted to be kept moist at all times so as to reduce the friction of the grease indicated at 2 with the surface of the gelatin. Preferably in conjunction with the moist gelatin coating 66 the grease tube contains small particles of water or an aqueous solution made non-freezing by the addition of a suitable ingredient such as glycerin, alcohol, or like liquids, or suitable salts of known character, such as calcium chloride or the like. These particles of water 3 are embedded in the grease and remain therein.

The water particles have a peculiar action in respect to the grease, and that is to keep the gelatin moist and slippery up to the saturation point. That is to say, the coating 66 will tend to absorb moisture until it is saturated whereupon no further moisture will be taken from the grease. The moisture held in the gelatin causes the gelatin to be repellent of grease and to provide a smooth surface of relatively low friction with respect to the grease. The water in the grease at the same time serves to reduce the internal friction of flow of the grease so that with the adhesion to the side walls greatly reduced and the internal friction greatly reduced, the grease may be propelled through the pipeline system with great facility.

A suitable method of coating the inner walls of the tubing of which the pipeline system is formed is as follows. The warm metal is coated with a hot solution consisting of 20% hard gelatin, 20% glycerin and the remainder water which is allowed to set by chilling or drying and chilling. The gelatin is then soaked while cold in a 40% solution of formalin for a short period of time, for example, three minutes, in order to preserve the gelatin against deterioration.

In order to secure more firm adhesion of the gelatin to the inside walls of the tubing, the gelatin may be applied in two coats. The first coat may consist of a 3% gelatin solution with 1% acetic acid added thereto.

This first coat is dried, and then a coating as per the above proportions, namely, 20% hard gelatin, 20% glycerin and 60% water is applied on top of the first applied coating.

The entire pipeline system for delivering grease shown in Figure 3 may thus be suitably prepared by a coating of gelatin which is kept moist by the moisture contained within the grease.

As shown in Figure 4, the ends of the tubes 26 and 36 where they enter the arms 34 and 35 are thus treated with the coating 65. In assembling the pipes 26 and 36 with the metering units the pipes are introduced into the hollow arms 34 and 35 and these arms are then shrunk by pressure upon the ends of the tubes 26 and 36, this shrinking being shown in somewhat exaggerated form in Figure 4.

The pipes such as 26 and 36 may thus be coated internally with gelatin or other material which is relatively repellent to grease or has a low coefficient with respect to grease and a joint may be made to the metering units or other couplings as by shrinking pressure applied to the sockets in which the ends of the tubes are to be mounted. Since grease is relatively thick an absolute fluid tight joint is not required.

Preferably in the preparation of the gelatin a material is added thereto to raise its melting point to a suitable value for the use to which it is put. The grease may contain a preservative of germicide such as formaldehyde or benzoate of soda, or the like, to prevent deterioration of the gelatin by germicidal action thereupon.

As an alternative method of maintaining the desired low adhesion between grease and the internal walls of the pipeline system the inside surface of the pipeline system may be coated with mercury, that is its surface may be amalgamated, and the grease may contain particles of mercury suitably introduced therein as disclosed in my copending application Serial No. 384,120, filed August 7, 1929, the small amount of mercury in the grease maintaining the coating of mercury upon the inside of the pipeline system.

The mercury has no adverse affect upon the bearings and, in fact, tends to amalgamate the surfaces even if they are of iron or steel and tends to reduce friction particularly where the motion between the bearing parts is relatively slow.

The amount of moisture which is to be contained in the grease where the moisture is to maintain the gelatin damp may be quite low in view of the fact that the system is sealed by grease and due to the repellent action between grease and the damp film of gelatin the moisture does not have an opportunity to escape. Therefore, a moisture content of the grease consisting of only a few percent by volume is ample to maintain the gelatin in moist, slippery condition. The gelatin may be introduced by cleaning the tubes and running a solution of gelatin in hot condition through the tubes and then cooling the same. Any other equivalent for holding a wet surface upon the inside of the pipeline system is contemplated as within the purview of my present invention.

The presence of water in grease may under certain conditions have the effect of rusting the bearings, particularly such bearings as employ polished surfaces, such as steel balls or rollers, or their races. Water is a catalyst particularly for the action of oxygen upon iron or steel. A catalyst is a substance which increases the speed of a chemical action, therefore, the presence of water with air in the bearings would tend to produce rust, that is ferrous oxide. The catalytic properties of water cannot be changed but the rusting may be avoided by preventing the entry of oxygen.

Preferably this is done by employing only distilled water, which is free of oxygen, and keeping the bearings packed with grease which excludes air and atmospheric oxygen.

The grease has a greater affinity for metallic surfaces than has water with the result that water will not dislodge the grease so long as the action of grease is present. The water has no adverse effect on bronze bushings or the like and may, therefore, be employed freely therein.

The inside surface of the pipeline system may be prepared to minimize the adhesion of grease thereto by making the inside surface of the tubing very smooth. This may be achieved by polishing the inside surface as by a special mandrel or by applying a coating of metal which will assume a smooth surface as, for example, by tinning the inside surface of the tube.

Iron tubing may be employed and the same may be tinned upon the inside in order to provide a smooth surface, and also to provide a surface which will readily amalgamate with mercury and hold a mercury film.

Where the inside surface of the tubing is changed by applying a coating which is relatively grease repellent substances may be employed for producing such coating which give a permanent finish not replenished by the contents of the grease. For example, the inside of a pipeline system may be coated with celluloid or lacquer, or other coating applied in liquid or semi-liquid form and having sufficient elasticity to permit of the bending of the pipes and the shrinkage of the same in the sockets, such as 34 and 35, shown in Figure 4 for making couplings without cracking or chipping or scaling off which would tend to obstruct the relatively small passageways in the resistance units.

Where gelatin, glue, or the like, is employed upon the inside surface of the pipeline system, such moist gelatin or glue is preferably kept from freezing and the moisture in the grease is kept from freezing by the addition of a soluble material which raises the freezing point of the moisture or of the wet gelatin or glue.

The pipeline system may be made wholly of material which has a low frictional resistance with respect to the lubricant which is to be forced through the same. I may employ aluminum tubing which presents a low friction to flow of the heavy lubricant. The aluminum tubing has another important function and that is that it is very light and, hence, the effect of lubrication upon the pipeline system is greatly decreased.

The type of coupling herein shown, namely, the shrinking by mechanical pressure of the sockets upon the ends of the tubes, as shown in Figure 4, provides a satisfactory method of making a joint.

I do not intend to be confined to the details of construction and mode of preparation herein disclosed, as I believe it is broadly new to provide a specially prepared grease for use in a pipeline system to reduce the friction of flow thereof, or to specially prepare the inside of the pipeline system to reduce the friction of flow of any kind of grease therein, and I believe it is new to have a specially prepared pipeline system and to employ therein a special grease all to the end of facilitating the operation of a centralized lubricating system employing grease.

What I claim is:

1. The method of reducing the resistance to the flow of grease in a pipeline which comprises forming a film of light fluid between the grease and the walls of the pipeline.

2. The method of reducing the resistance to the flow of grease in a pipeline which comprises forming a film of fluid repellent to grease upon the interior walls of the pipeline.

3. The method of reducing the frictional resistance of flow of grease in a pipeline system which comprises forming and maintaining a liquid film upon the inside surface of the containing pipe.

4. The method of reducing the frictional resistance to flow of grease in a pipeline which comprises forming and maintaining upon the inside surface of the containing pipe a layer of moisture.

5. The method of reducing the frictional resistance to flow of grease in a pipeline which comprises forming and maintaining upon the inside surface of the pipe a wet film of gelatin.

6. The method of reducing the frictional resistance to flow of grease in a pipe which comprises, coating the inside surface of the pipe with an adherent film of liquid repellent of grease.

7. The method of preparing a pipeline to reduce the friction of flow of grease therethrough which comprises fixing a film of liquid upon the inside surface of the pipe.

8. In combination a grease pump, a pipeline, means providing grease distributing outlets, said pipeline having a film of liquid fixed upon the inside wall thereof to reduce the frictional flow of grease therethrough.

9. In a centralized lubricating system, means for supplying grease containing mercury, a pipeline connected thereto, said pipeline having distribution connections disposed along its length, said pipeline having its inside surface coated with mercury.

10. In a centralized lubricating system, means for supplying grease containing moisture, a pipeline connected thereto, said pipeline having distribution connections disposed along its length, said pipeline having the inside surface thereof coated with a solid moisture absorbing medium.

11. In a centralized lubricating system, means for supplying grease containing water in finely subdivided form, a pipeline connected thereto, said pipeline having distribution connections disposed along its length, said pipeline having the inside surface thereof coated with gelatin.

12. In a centralized lubricating system, means for supplying grease containing a fluid repellent of grease, a pipeline connected thereto, said pipeline having distribution connections disposed along its length, said pipeline having the inside surface thereof coated with tin.

13. In a centralized lubricating system, a pipeline having distribution outlets disposed along its length, said pipeline having an inside diameter of not less than five thirty-seconds of an inch and containing a coating for reducing the friction of grease therewith.

14. The method of reducing the friction to flow of grease in a pipeline which comprises coating the pipeline with a film of moisture absorbing material and passing grease with moisture in excess of the saturation requirements of said film through said pipeline.

15. The method of reducing the resistance to the flow of grease which comprises mixing and conveying therewith a light fluid non-dissolvable with respect to grease.

16. In a centralized lubricating system, a source of grease under pressure, a pipe line for distributing grease from said source to bearings to be lubricated, the inside surface of said pipe line being coated with a flexible coating to reduce the friction of flow of grease therethrough.

17. In a centralized lubricating system, a source of grease under pressure, a pipe line for distributing grease from said source to bearings to be lubricated, the inside surface of said pipe line being coated with a flexible coating to reduce the friction of flow of grease therethrough, the grease having mixed therewith a fluid medium repellent to grease and co-acting with said flexible coating.

18. In a centralized lubricating system, a source of grease under pressure, a pipe line connected thereto, said pipe line having distributing outlets disposed along its length, and comprising a tube the inside surface of which is wet with a liquid repellent to grease.

19. In a centralized lubricating system, a pipe line for conveying lubricant to bearings to be lubricated, said pipe line having distribution outlets disposed along its length and comprising a tube the inside surface of which is coated with moist gelatin.

20. A lubricant conveying pipe line having upon its interior surface a material which is inherently repellent of lubricant.

21. A lubricant conveying pipe line having upon its interior surface a material which is inherently repellent of lubricant, said material being capable of readily absorbing moisture.

OSCAR U. ZERK.